(12) United States Patent
Lee

(10) Patent No.: US 8,357,315 B2
(45) Date of Patent: Jan. 22, 2013

(54) CATHODE ACTIVE MATERIAL, CATHODE INCLUDING THE SAME AND LITHIUM BATTERY INCLUDING CATHODE

(75) Inventor: Jong-won Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 353 days.

(21) Appl. No.: 12/720,159

(22) Filed: Mar. 9, 2010

(65) Prior Publication Data
US 2011/0049419 A1    Mar. 3, 2011

(30) Foreign Application Priority Data

Aug. 25, 2009  (KR) .......................... 10-2009-0078849

(51) Int. Cl.
*H01B 1/08*  (2006.01)
*H01M 4/02*  (2006.01)
(52) U.S. Cl. .............. 252/520.22; 252/521.5; 429/218.1
(58) Field of Classification Search ............. 252/520.21, 252/520.22, 521.5; 429/218.1, 231.5; 423/306
See application file for complete search history.

(56) References Cited

U.S. PATENT DOCUMENTS

| 6,749,967 B2 | 6/2004 | Li et al. |
| 7,590,196 B2 | 9/2009 | Gibbs |
| 7,964,118 B2 * | 6/2011 | Iizuka et al. ............. 252/520.21 |
| 2009/0123813 A1 * | 5/2009 | Chiang et al. ................... 429/50 |
| 2009/0130559 A1 * | 5/2009 | Okada et al. .................. 429/224 |

FOREIGN PATENT DOCUMENTS

JP    2007-536519    12/2007

* cited by examiner

*Primary Examiner* — Mark Kopec
(74) *Attorney, Agent, or Firm* — Stein McEwen, LLP

(57) ABSTRACT

A cathode active material, a cathode including the cathode active material, and a lithium battery including the cathode. A lithium manganese phosphate cathode active material having an olivine structure represented by $Li_xMn_{1-y-z}M'_yM''_zPO_4$, where $0.6 \leq x \leq 1.0$, $0 < y \leq 0.2$, $0 < z \leq 0.1$, M' is at least one metal selected from the group consisting of Mg, Fe, Co, Ni, Ca, Cu and Zn, and M'' is at least one metal selected from the group consisting of Zr and Mo.

14 Claims, 2 Drawing Sheets

CATHODE ACTIVE MATERIAL, CATHODE INCLUDING THE SAME AND LITHIUM BATTERY INCLUDING CATHODE

CROSS-REFERENCE TO RELATED APPLICATION

This application claims the benefit of Korean Patent Application No. 10-2009-0078849, filed on Aug. 25, 2009, in the Korean Intellectual Property Office, the disclosure of which is incorporated herein in its entirety by reference.

BACKGROUND

1. Field

An embodiment of the present disclosure relates to cathode active materials, cathodes including the cathode active materials, and lithium batteries including the cathodes, and more particularly, to cathode active materials having a high voltage and energy density, cathodes including the cathode active materials, and lithium batteries including the cathodes.

2. Description of the Related Art

A lithium metal phosphate has high stability when used as a cathode active material in a rechargeable battery. For example, since $LiFePO_4$ has a strong Fe—P—O bond, oxygen does not leak even if an electrolyte battery is shortened or overheats.

A $LiFePO_4$ material that has been widely used has excellent thermal stability and lifetime properties, but reduced energy density due to a low voltage of 3.4 V. On the other hand, a $LiMnPO_4$ material has the same theoretical capacity as the $LiFePO_4$ material and a voltage equal to or greater than 4.0 V, and thus the $LiMnPO_4$ material has a theoretical energy density higher by 15% or more than the $LiFePO_4$ material.

However, a structural change referred to as Jahn-Teller distortion occurs in a $LiMnPO_4$ material due to $Mn+3$ ions generated during charging, and thus an actual capacity of the $LiMnPO_4$ material is so low.

SUMMARY

An embodiment of the present invention provides cathode active materials having a high voltage and energy density, and an improved C-rate property.

Another embodiment of the present invention provides cathodes including the cathode active materials.

A further embodiment of the present invention provides lithium batteries including the cathodes.

Additional aspects will be set forth in part in the description which follows and, in part, will be apparent from the description, or may be learned by practice of the presented embodiments.

According to an aspect of the present invention, a lithium manganese phosphate cathode active material has an olivine structure represented by Formula 1:

$$Li_xMn_{1-y-z}M'_yM''_zPO_4, \quad \text{Formula 1}$$

where $0.6 \leq x \leq 1.0$, $0 < y \leq 0.2$, $0 < z \leq 0.1$.

According to an aspect of the present invention, M' is at least one metal selected from the group consisting of Mg, Fe, Co, Ni, Ca, Cu and Zn, and According to another aspect of the present invention, M" is at least one metal selected from the group consisting of Zr and Mo.

According to another aspect of the present invention, a cathode includes the lithium manganese phosphate cathode active material.

According to another aspect of the present invention, a lithium battery includes the cathode.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION

Figure 1:
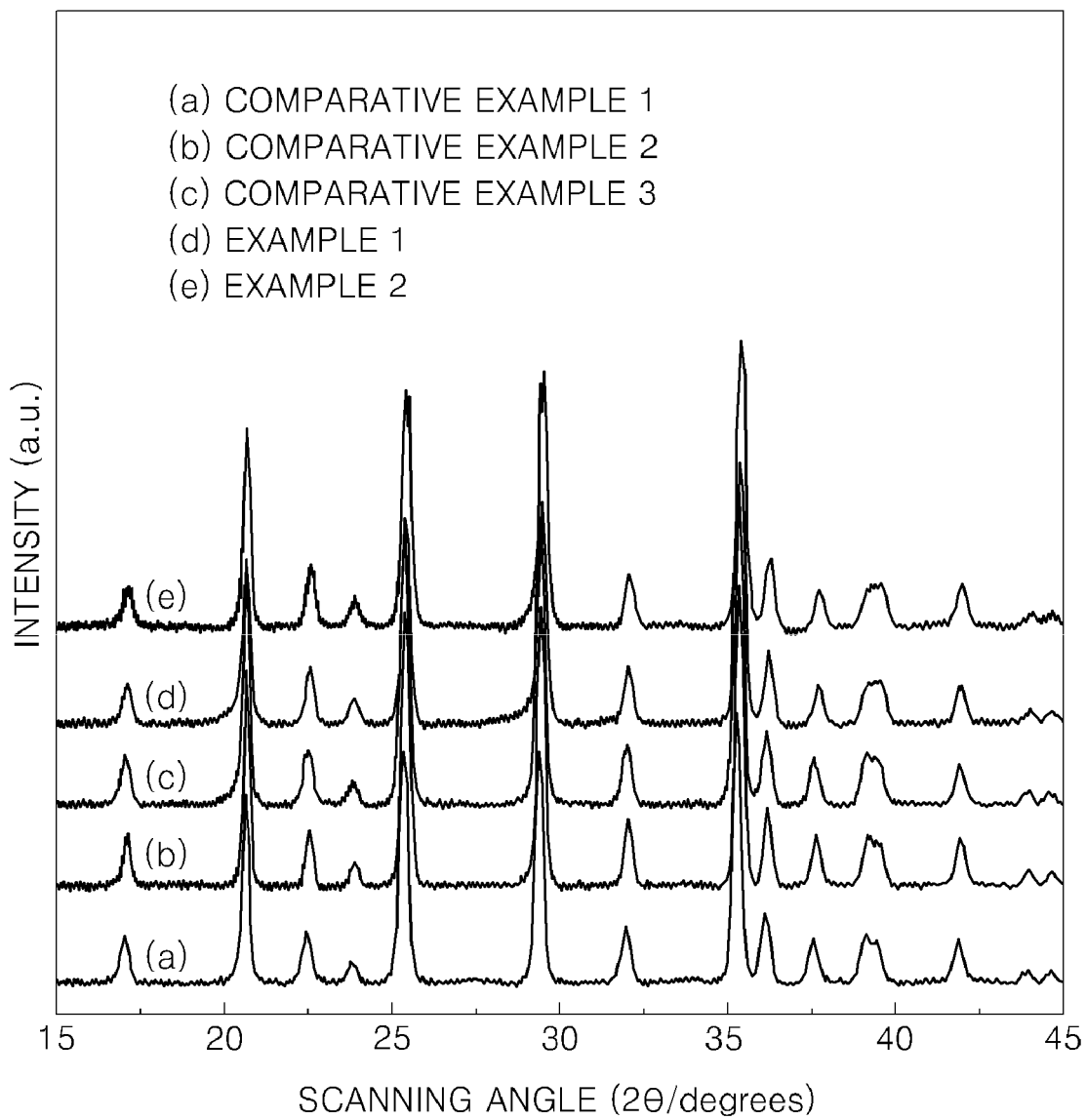
FIG. 1 is a graph showing X-ray diffraction patterns of cathode active material powders prepared in Examples 1 and 2 and Comparative Examples 1 to 3.

Hereinafter, a cathode active material, a cathode including the cathode active material, and a lithium battery including the cathode will be described with regard to exemplary embodiments of the invention. Reference will now be made in detail to the present embodiments of the present invention, examples of which are illustrated in the accompanying drawings, wherein like reference numerals refer to the like elements throughout. The embodiments are described below in order to explain the present invention by referring to the figures.

A cathode active material according to an embodiment of the present invention is a lithium manganese phosphate having an olivine structure according to Formula 1 below:

$$Li_xMn_{1-y-z}M'_yM''_zPO_4, \quad \text{Formula 1}$$

where $0.6 \leq x \leq 1.0$, $0 < y \leq 0.2$, and $0 < z \leq 0.1$,

M' is at least one metal selected from the group consisting of Mg, Fe, Co, Ni, Ca, Cu and Zn, and M" is at least one metal selected from the group consisting of Zr and Mo.

According to the present embodiment, a lithium manganese phosphate cathode active material may include at least two heterogeneous elements in a structure of $LiMnPO_4$ so as to prevent a structural change generated during charging and discharging, thereby improving a charge/discharge capacity, an energy density, and an C-rate property. That is, electrical conductivity of the lithium manganese phosphate cathode active material may be improved while preventing Jahn-Teller distortion.

In Formula 1, M' may be Mg alone, or a combination of Mg and at least one selected from the group consisting of Fe, Co, Ni, Ca, Cu, and Zn.

In Formula 1, when M' is Mg, $0.84 \leq x \leq 1.0$, $0.02 \leq y \leq 0.1$, and $0.02 \leq z \leq 0.04$.

A compound in which some elements of a lithium manganese phosphate of Formula 1 are substituted by heterogeneous metals has the above range of atomic ratio, thereby forming a single phase of an olivine structure of an orthorhombic system without generating a second phase or an impurity phase.

The cathode active material may be prepared using a solid phase method wherein a mixture including a lithium source, a manganese source, an M' source and an M" source is used. For example, the cathode active material may be prepared using a method including mixing the lithium source, the manganese source, the M' source and the M" source in a predetermined molar ratio; dissolving this mixture in water so as to prepare a solution; adding an additive to the solution so as to prepare a mixed solution; and sintering the mixed solution.

Alternatively, the cathode active material may be prepared by previously adding a conductive agent to a raw material for forming the cathode active material during the preparation of the cathode active material. That is, the cathode active material may be prepared using a method including mixing the lithium source, the manganese source, the M' source and the M" source in a predetermined molar ratio; mixing a conductive agent, for example, a carbon powder to this mixture; and heating the resultant at a temperature of about 500 to about 700° C. under a nitrogen or Ar atmosphere for about 3 to about 12 hours.

In this case, the conductive agent may have an amount of about 2 to about 20 wt % with respect to the cathode active material.

A cathode according to an embodiment of the present invention includes the above-described cathode active material. The cathode may be prepared, for example, by forming a cathode material composition including the cathode active material and a binding agent in a predetermined shape, or by coating the cathode material composition on a current collector such as an aluminum foil. The cathode material composition may include a conductive agent, a solvent, etc.

In detail, a cathode plate may be prepared by preparing the cathode material composition, coating the cathode material composition directly on the current collector of the aluminum foil or casting a cathode material composition on a support, delaminating the cathode active material film from the support, and then laminating the cathode material film on the current collector of the aluminum foil. The cathode is not limited to the above-described forms, and may have various forms.

In order to obtain a battery with a high capacity, the battery may be charged with a large amount of current. To achieve this, a material having a low electric resistance may be provided. In order to reduce a resistance of an electrode, various conductive agents are added to the cathode material composition. In this case, examples of the conductive agents may include carbon black and graphite granules. The conductive agent may be previously added during the manufacturing of the cathode active material, as described above.

The binding agent included in the cathode material composition may be one selected from the group consisting of a vinylidene fluoride/hexafluoropropylene copolymer, poly vinylidene fluoride, polyacrylonitrile, polymethylmethacrylate, polytetrafluoroethylene and a mixture thereof, and a styrene butadiene rubber polymer, and the solvent may be at least one selected from the group consisting of N-methylpyrrolidone(NMP), acetone, and water. In the cathode material composition, the cathode active material, the conductive agent, the binding agent, and the solvent may have respective amounts as in the case of a general lithium battery.

A lithium battery according to an embodiment of the present invention includes the cathode including the cathode active material. The lithium battery may be prepared by the following method.

As described above, the cathode including the cathode active material is prepared. Then, an anode plate may be prepared using the same method as that of preparing the cathode plate, the method including mixing an anode active material, a conductive agent, a binding material and a solvent so as to prepare an anode material composition, coating the anode material composition directly on a copper current collector or casting an anode material composition on a support, delaminating the anode material film from the support, and then laminating the anode material film on the copper current collector.

Any material that is generally used in the art may be used as the anode active material. The anode active material may be at least one selected from the group consisting of a lithium metal, a lithium alloy, a carbon material and graphite. The conductive agent, the binding agent, and the solvent included in the anode material composition may be the same as those of the cathode material composition. In the anode material composition, the anode active material, the conductive agent, the binding agent, and the solvent may have respective amounts of a general lithium battery.

Then, the cathode and an anode may be separated by a separator. Any separator that is generally used in a lithium battery may be used. The separator may have a low resistance with respect to ion-movement of electrolyte, and excellent impregnation capacity with regard to an electrolyte. For example, the separator may be one selected from the group consisting of a glass fiber, polyester, Teflon, polyethylene, polypropylene, polytetrafluoroethylene (PTFE) and combinations thereof, and may have the form of a non-woven fabric or a woven fabric. In particular, a windable separator such as a polyethylene and polypropylene may be used in a lithium ion battery. In addition, a separator having an excellent impregnation capacity of organic electrolyte may be used in the lithium ion polymer battery. This separator may be prepared using the following method.

The separator may be prepared by mixing a polymer resin, a filler and a solvent to prepare a separator composition, and then coating and drying the separator composition directly on an electrode to form a separator film, or casting and drying the separator composition on a support, delaminating a separator film from the support, and then laminating the separator film on the electrode.

The polymer resin is not limited to any particular material, and may be any material that is used as a binding agent of an electrode plate. For example, the polymer resin may be one selected from the group consisting of vinylidene fluoride/hexafluoropropylene copolymer, polyvinylidenefluoride, polyacrylonitrile, polymethylmethacrylate or a mixture thereof.

The electrolyte used in the lithium battery may be prepared by dissolving one lithium salt selected from the group consisting of $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiSbF_6$, $LiAlO_4$, $LiAlCl_4$, $LiN(C_xF_{2x+1}SO_2)(C_yF_{2y+1}SO_2)$ (where x and y are natural numbers), $LiCl$, $LiI$, and a mixture thereof in one solvent selected from the group consisting of propylene carbonate, ethylene carbonate, fluoroethylene carbonate, diethyl carbonate, ethyl methyl carbonate, methyl propyl carbonate, butylene carbonate, benzonitrile, acetonitrile, tetrahydrofuran, 2-methyl tetrahydrofuran, γ-butyrolactone, dioxolane, 4-methyl dioxolane, N,N-dimethylformamide, dimethylacetamide, dimethylsulfoxide, dioxane, 1,2-dimethoxy ethane, sulpholane, dichloroethane, chlorobenzene, nitrobenzene, dimethyl carbonate, methyl ethyl carbonate, diethyl carbonate, methyl propyl carbonate, methylisopropyl carbonate, ethylpropyl carbonate, dipropyl carbonate, dibutyl carbonate, diethylene glycol, dimethyl ether and a mixture thereof.

Then, the separator is disposed between the cathode plate and the anode plate so as to form a battery structure. The preparation of a lithium ion battery is completed by winding or folding the battery structure in order to accommodate the battery structure in a cylindrical battery case or a square battery case, and then injecting the organic electrolyte into the cylindrical battery case or the square battery case. The preparation of a lithium ion polymer battery is completed by stacking battery structures in a by-cell structure, impregnating the battery structures in an organic electrolyte, accommodating the resultant in a pouch, and sealing the resultant.

The lithium battery may be used in an electric vehicle requiring a high capacity and high output battery as well as in a general cellular phone and a portable computer, and may be coupled to a general internal combustion engine, a fuel cell, or a super capacitor so as to be used in a hybrid vehicle. In addition, the lithium battery may be used in other apparatuses requiring a high output and high voltage battery.

Hereinafter, one or more embodiments of the present invention will be described in detail with reference to the following examples. However, these examples are not intended to limit the purpose and scope of the one or more embodiments of the present invention.

EXAMPLE 1

Preparation of Cathode Active Material

Powders of $Li_2CO_3$, $MnCO_3$, $Mg(NO_3)_2$, $C_{15}H_{36}O_5Zr$ and $NH_4H_2PO_4$ were mixed in a molar ratio of 0.5:0.88:0.1:0.02:1.0, and then carbon black (Ketjen Black 600JD) was mixed in an amount of 10 wt % with respect to a cathode active material. The mixture was reacted at a temperature of 600° C. under a nitrogen atmosphere for 3 hours.

Preparation of Lithium Half Cell

Slurry was prepared by mixing the prepared cathode active material and PVdF binding agent in a weight ratio of 95:5. The slurry was coated on an aluminum foil having a thickness of 15 µm by using a doctor blade. A cathode plate was prepared by drying the resultant at 80° C., and then vacuum-drying the resultant at 110° C. A half cell (2032 size) was prepared by using the cathode plate, a lithium opposite electrode, a polytetrafluoroethylene (PTFE) separator, and an electrolyte in which 1.3 M of $LiPF_6$ was dissolved in ethylene carbonate (EC) and diethyl carbonate (DEC) of which volume ratio is 3:7.

EXAMPLE 2

A cathode active material and a half cell were prepared in the same manner as in Example 1 except that powders of $Li_2CO_3$, $MnCO_3$, $Mg(NO_3)_2$, $C_{15}H_{36}O_5Zr$ and $NH_4H_2PO_4$ were mixed in a molar ratio of 0.48:0.88:0.1:0.02:1.0.

EXAMPLE 3

A cathode active material and a half cell were prepared in the same manner as in Example 1 except that powders of $Li_2CO_3$, $MnCO_3$, $Mg(NO_3)_2$, $(NH_4)_6Mo_7O_{24}$ and $NH_4H_2PO_4$ were mixed in a molar ratio of 0.5:0.88:0.1:0.02:1.0.

EXAMPLE 4

A cathode active material and a half cell were prepared in the same manner as in Example 1 except that powders of $Li_2CO_3$, $MnCO_3$, $Mg(NO_3)_2$, $C_{15}H_{36}O_5Zr$, $(NH_4)_6Mo_7O_{24}$ and $NH_4H_2PO_4$ were mixed in a molar ratio of 0.5:0.88:0.1:0.01:0.01:1.0.

COMPARATIVE EXAMPLE 1

A cathode active material and a half cell were prepared in the same manner as in Example 1 except that powders of $Li_2CO_3$, $MnCO_3$ and $NH_4H_2PO_4$ were mixed in a molar ratio of 0.5:1.0:1.0.

COMPARATIVE EXAMPLE 2

A cathode active material and a half cell were prepared in the same manner as in Example 1 except that powders of $Li_2CO_3$, $MnCO_3$, $Mg(NO_3)_2$ and $NH_4H_2PO_4$ were mixed in a molar ratio of 0.5:0.98:0.02:1.0.

COMPARATIVE EXAMPLE 3

A cathode active material and a half cell were prepared in the same manner as in Example 1 except that powders of $Li_2CO_3$, $MnCO_3$, $C_{15}H_{36}O_5Zr$ and $NH_4H_2PO_4$ were mixed in a molar ratio of 0.5:0.98:0.02:1.0.

COMPARATIVE EXAMPLE 4

A cathode active material and a half cell were prepared in the same manner as in Example 1 except that powders of $Li_2CO_3$, $MnCO_3$, $Mg(NO_3)_2$ and $NH_4H_2PO_4$ were mixed in a molar ratio of 0.5:0.9:0.1:1.0.

COMPARATIVE EXAMPLE 5

A cathode active material and a half cell were prepared in the same manner as in Example 1 except that powders of $Li_2CO_3$, $MnCO_3$, $Mg(NO_3)_2$ and $NH_4H_2PO_4$ were mixed in a molar ratio of 0.5:0.88:0.12:1.0.

EVALUATION EXAMPLE 1

X-Ray Diffraction Test

An X-ray diffraction test was performed in order to analyze the structures of the cathode active materials prepared in Examples 1 and 2, and Comparative Examples 1 through 3. The test result is shown in FIG. 1.

As shown in FIG. 1, since all cathode active material powders exhibit an olivine structure, the cathode active material powders do not surpass the solid solution limit so that a second phase or an impurity phase is not generated even if some elements are substituted by at least two heterogeneous elements like in one or more embodiments of the present invention.

EVALUATION EXAMPLE 2

Room Temperature Charge/Discharge Test

A charge/discharge test was performed with respect to the lithium half cell prepared in Example 1 through 3 and Comparative Examples 1 through 3 at a room temperature of 25° C.

In detail, charging was performed on the lithium half cell up to 4.5 V by supplying a static current of 0.05 C, and then static-voltage charging was performed while a voltage of 4.5 V was being applied until a measured current reached 0.01 C. Then, discharging was performed up to 2.0 V by supplying a static current of 0.05 C. 1C represents a current density of 150 mA/g.

Figure 2:
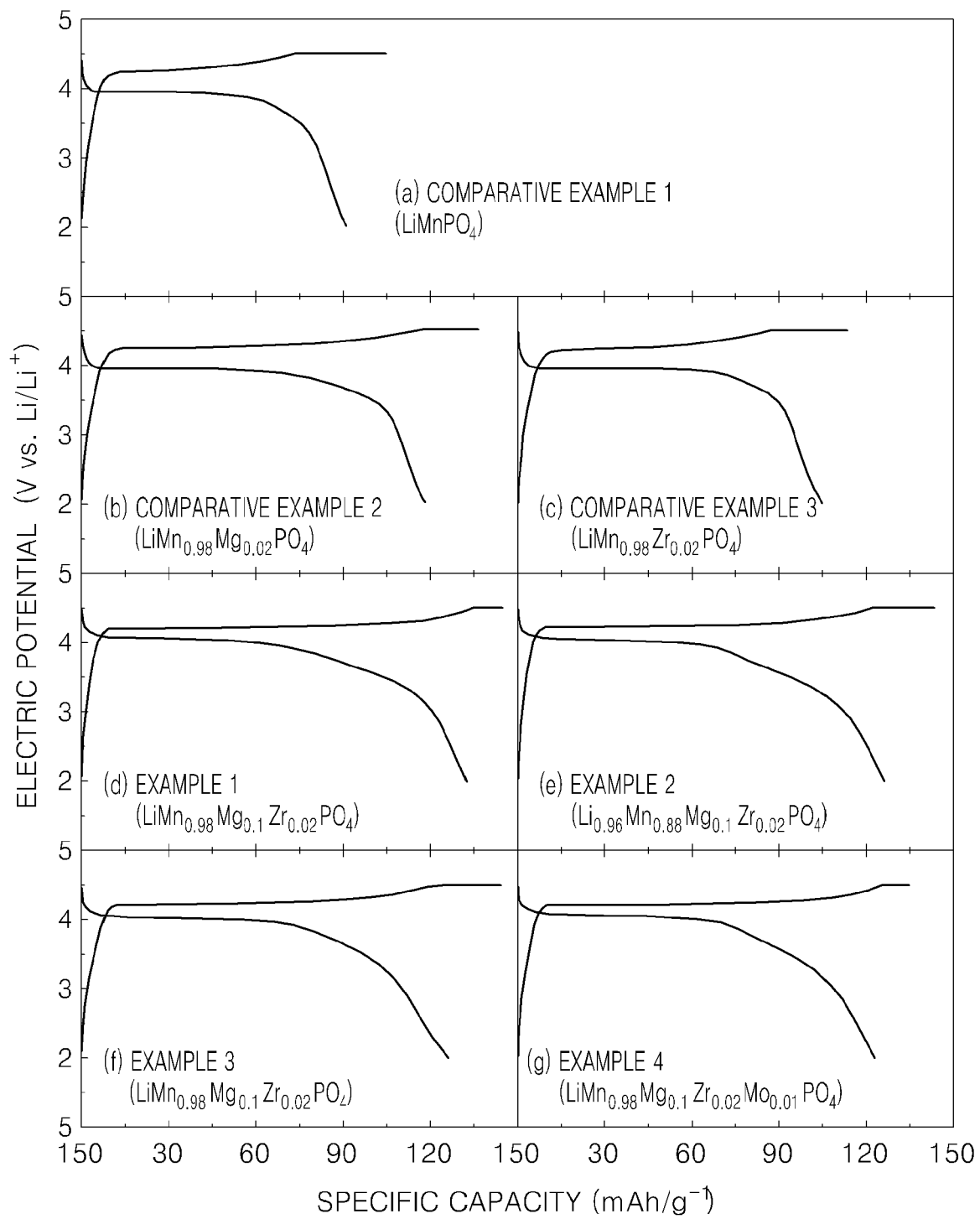
FIG. 2 illustrates graphs of charge/discharge curves of cathode active materials synthesized in Examples 1 to 4, and Comparative Examples 1 to 3.

FIG. 2 illustrates graphs of charge/discharge curves of the cathode active materials synthesized in Examples 1 to 4, and Comparative Examples 1 to 3. As shown in FIG. 2, the curves of Examples 1 to 4, when two heterogeneous elements, that is, Mg and Zr, or Mg and Mo are simultaneously used, exhibit a higher charge/discharge capacity than the curves of Comparative Examples 1 to 3. In particular, the cathode active material synthesized in Example 1 exhibits a discharge capacity of 134 mAh/g, which is very high and corresponds to 89% of a theoretical capacity (about 150 mAh/g).

In addition, when the charge/discharge curves are roughly checked, the charge/discharge curves show respective ranges in which similar voltages are maintained. In the cases of Examples 1 to 4, when two heterogeneous elements are used, capacities in these ranges increase, voltages of these ranges decreases during charging, and voltages of theses ranges increases during discharging. In other words, it may be seen that a polarization resistance during charging/discharging decreases.

Table 1 shows charge capacities, discharge capacities, discharge energies and C-rate properties of the lithium half cells prepared in Examples 1 to 4 and Comparative Examples 1 to 5.

The discharge energies were measured using the following method. The discharge energies were calculated by integrating the discharge curves of FIG. 2, according to the Equation Discharge energy (mWh/g)=Discharge capacity (mAh/g)× Voltage (V).

The C-rate properties were measured using the following method. First, a lithium half cell charged up to 4.5 V was discharged to 2.0 V by supplying a static current of 0.05 C. The lithium half cell was charged up to 4.5 V by supplying a static current of 0.05 C, and then static-voltage charging was performed until a measured current reached 0.01 C while a voltage was maintained to 4.5 V. Then, the lithium half cell was discharged up to 2.0 V by supplying a static current of 1 C. After measuring the discharge capacities, the c-rate properties were calculated according to the Equation C-rate property [%]=Discharge capacity at 1 C/Discharge capacity at 0.05 C.

TABLE 1

|  | Composition | Charge Capacity (mAh/g) | Discharge Capacity (mAh/g) | Discharge Energy (mWh/g) | C-rate Property (1 C/0.05 C, %) |
|---|---|---|---|---|---|
| Example 1 | $LiMn_{0.88}Mg_{0.1}Zr_{0.02}PO_4$ | 145 | 134 | 495 | 85 |
| Example 2 | $Li_{0.96}Mn_{0.88}Mg_{0.1}Zr_{0.02}PO_4$ | 143 | 126 | 467 | 79 |
| Example 3 | $LiMn_{0.88}Mg_{0.1}Mo_{0.02}PO_4$ | 144 | 126 | 466 | 78 |
| Example 4 | $LiMn_{0.88}Mg_{0.1}Zr_{0.01}Mo_{0.01}PO_4$ | 137 | 124 | 460 | 82 |
| Comparative Example 1 | $LiMnPO_4$ | 104 | 91 | 337 | 66 |
| Comparative Example 2 | $LiMn_{0.98}Mg_{0.02}PO_4$ | 136 | 118 | 440 | 45 |
| Comparative Example 3 | $LiMn_{0.98}Zr_{0.02}PO_4$ | 114 | 105 | 391 | 67 |
| Comparative Example 4 | $LiMn_{0.9}Mg_{0.1}PO_4$ | 131 | 121 | 455 | 76 |
| Comparative Example 5 | $LiMn_{0.88}Mg_{0.12}PO_4$ | 126 | 118 | 439 | 74 |

As shown in Table 1, when Mg and Zr, or Mg and Mo are simultaneously used, a discharge capacity and a discharge energy increase remarkably, and a C-rate property (a ratio of a discharge capacity measured at 1 C with respect to the case of 0.05 C) increases. In particular, the cathode active material synthesized in Example 1 exhibits a high C-rate property of 85%.

As described above, according to the one or more of the above embodiments of the present invention, a new lithium manganese phosphate cathode active material is used, and thus the charge/discharge capacity and the energy density of a lithium battery may increase, and the C-rate property of the lithium battery may be improved.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A lithium manganese phosphate cathode active material having an olivine structure represented by Formula 1:

$$Li_xMn_{1-y-z}M'_yM''_zPO_4,\qquad\text{Formula 1}$$

where $0.6 \leq x \leq 1.0$, $0 < y \leq 0.2$, $0 < z \leq 0.1$,

M' is at least one metal selected from the group consisting of Mg, Fe, Co, Ni, Ca, Cu and Zn, and M" is Mo.

2. The lithium manganese phosphate cathode active material of claim 1, wherein M' comprises Mg.

3. The lithium manganese phosphate cathode active material of claim 2, wherein $0.84 \leq x \leq 1.0$, $0.02 \leq y \leq 0.1$, $0.02 \leq z \leq 0.04$.

4. The lithium manganese phosphate cathode active material of claim 1, wherein M" further comprises Zr.

5. A cathode comprising a lithium manganese phosphate cathode active material having an olivine structure represented by Formula 1:

$$Li_xMn_{1-y-z}M'_yM''_zPO_4,\qquad\text{Formula 1}$$

where $0.6 \leq x \leq 1.0$, $0 < y \leq 0.2$, $0 < z \leq 0.1$,

M' is at least one metal selected from the group consisting of Mg, Fe, Co, Ni, Ca, Cu and Zn, and M" is Mo.

6. The cathode of claim 5, wherein M' comprises Mg.

7. The cathode of claim 6, wherein $0.84 \leq x \leq 1.0$, $0.02 \leq y \leq 0.1$, $0.02 \leq z \leq 0.04$.

8. The cathode of claim 5, wherein M" further comprises Zr.

9. A lithium battery comprising the cathode of claim 5.

10. A lithium manganese phosphate cathode active material having an olivine structure represented by Formula 1:

$$Li_xMn_{1-y-z}M'_yM''_zPO_4,\qquad\text{Formula 1}$$

where $0.6 \leq x \leq 1.0$, $0 < y \leq 0.2$, $0 < z \leq 0.1$,

M' is at least one metal selected from the group consisting of Mg and Ca, and

M" is at least one metal selected from the group consisting of Zr and Mo.

11. The lithium manganese phosphate cathode active material of claim 10, wherein M' further comprises at least one metal selected from the group consisting of Fe, Cu and Zn.

12. A cathode comprising a lithium manganese phosphate cathode active material having an olivine structure represented by Formula 1:

$$Li_xMn_{1-y-z}M'_yM''_zPO_4,\qquad \text{Formula 1}$$

where $0.6 \leqq x \leqq 1.0$, $0 < y \leqq 0.2$, $0 < z \leqq 0.1$,

M' is at least one metal selected from the group consisting of Mg and Ca, and

M'' is at least one metal selected from the group consisting of Zr and Mo.

13. The cathode of claim 12, wherein M' further comprises at least one metal selected from the group consisting of Fe, Cu and Zn.

14. A lithium battery comprising the cathode of claim 12.

* * * * *